A. GODAL.
PROCESS OF PRODUCING SULPHOAROMATIC SUBSTANCES FOR USE IN THE DECOMPOSITION OF FATS.
APPLICATION FILED APR. 15, 1919.
1,416,284. Patented May 16, 1922.
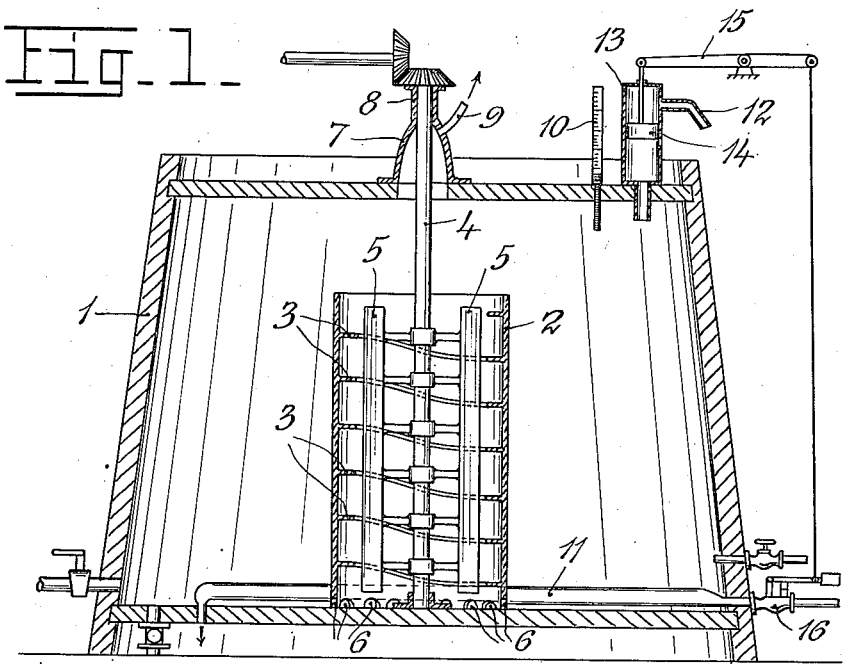
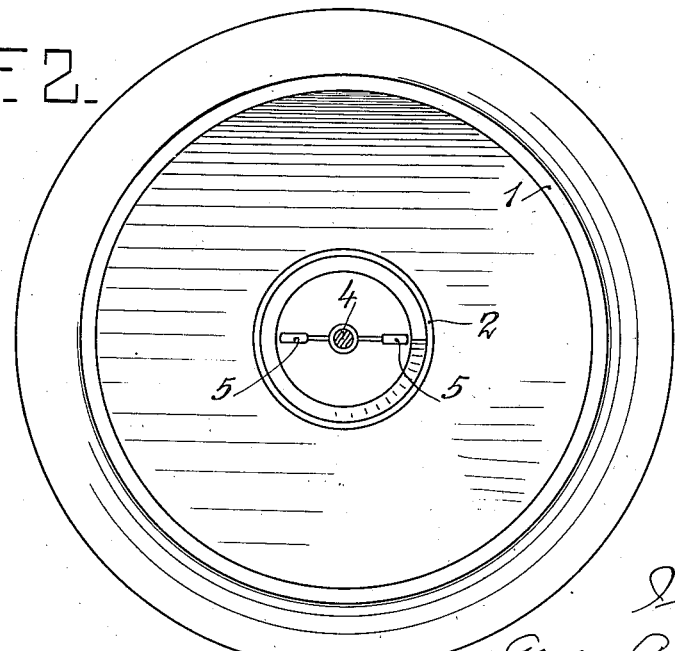

UNITED STATES PATENT OFFICE.

ARNE GODAL, OF VESTRE AKER, NEAR CHRISTIANIA, NORWAY.

PROCESS OF PRODUCING SULPHOAROMATIC SUBSTANCES FOR USE IN THE DECOMPOSITION OF FATS.

1,416,284.      Specification of Letters Patent.    Patented May 16, 1922.

Application filed April 15, 1919. Serial No. 290,349.

*To all whom it may concern:*

Be it known that I, ARNE GODAL, of Villa Fjeldet, Vestre Aker, near Christiana, in the Kingdom of Norway, have invented certain new and useful Improvements in Process of Producing Sulphoaromatic Substances for Use in the Decomposition of Fats; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the decomposition of fatty acid glycerides by the action of substances obtained by the sulfonation of mixtures of fatty acids and aromatic bodies. This decomposition method, which has been introduced by E. Twitchell has hitherto been carried out by boiling the fat in open vessels in an aqueous solution of the decomposition agent the heating having been effected by the direct introduction of steam.

The weak points of this process are substantially as follows:

1. An excessive discoloration of the resulting fatty acids.
2. A very long reaction time, at least 30 hours.

The discoloration of the product is principally due to the contact substance (decomposition agent) which is always of an intensive colour, this substance during the decomposition operation gradually entering into the body of fatty acid. In addition, a secondary colouring is caused by reason of the fact that the fatty acid in which the contact material is dissolved is subjected to the oxidizing action of the atmospheric oxygen.

This invention has for its object a mode of carrying the said process into effect whereby the drawbacks and difficulties above referred to are avoided.

The invention is based upon the observation that the colour of the product obtained by the sulfonation process is dependent upon the temperature at which the sulfonation takes place, so that the lower the temperatures employed are the weaker the colour of the product. In accordance with this observation a characteristic feature of this invention now consists in carrying the sulfonation into effect at a comparatively low temperature that is at a temperature below the melting point of the mixture of substances to be sulfonated. To make the use of such low temperatures practically possible the substance is dissolved in a quantity of a suitable solvent sufficient to make the mixture liquid at the low sulfonation temperature, which it is desired to employ. By dissolving the substance in a suitable quantity of a solvent which is not reacted upon by the acid employed, I have succeeded in effecting the sulfonation at a temperature of for instance +8° C. when the solidification temperature is about 45° C.

By working in accordance with this invention an efficient separation of the active contact substance is also made possible.

This will be obvious from the following: The product resulting after the sulfonation will consist of a mixture of active contact substance, unaltered fatty acid, aromatic substance, aromatic sulfonic acid as well as the solvent employed. By washing this mixture with dilute sulphuric acid the aromatic sulphonic acids could be removed. When the mixture subsequent to this treatment is washed with water the active contact substance will become dissolved, while the remaining solvent will contain unchanged fatty acid and aromatic substance. This mixture could then be subjected to a further sulfonation whereby additional quantities of contact substance are formed. This reuse of the residual solution may then be further continued in the same manner.

As above stated the contact substance is liable to enter into the produced fatty acid during the decomposition process. I have now ascertained that it is possible to materially reduce this tendency. The fact is that the aqueous solution must be considered as a colloidal solution. The state of equilibrium of this solution will for this reason be easily disturbed, when foreign substances are added. Foreign substances liable to effect such disturbance in the present instance are for instance sulphuric acid, aromatic sulphonic acids (electrolytes) as well as gases (air.)

When such disturbing substances are removed usually only 25 per cent or less and at most 50 per cent of the contact substance will enter into the fatty acid. Moreover up to 50 per cent of this portion will enter into the socalled "second water," which is added when the degree of decomposition has reached to about 80 per cent free fatty acids after the "first water" has been removed.

It is by these means possible to recover at least 80 per cent of the contact substance. It is then suitably precipitated from the "first water" by a metal salt for instance BaCO$_3$ and is thereupon transformed into active contact substance by a treatment with sulphuric acid. The second water is preferably drawn off before the fatty acid has been neutralized with BaCO$_3$ and may be used to initiate the next decomposition operation.

Owing to the fact that the colouring matter of the contact substance enters into the fatty acid together with the substance itself, a decrease of this transmission involves a reduction of the coloring of the fatty acid during the process. By the decomposition of white (colourless) fatty substances it is thus possible when for instance 0.5 per cent of contact substance is added to work for instance with a loss of only 0.1 per cent, as the resulting fatty acid is only slightly coloured. An obvious consequence of this fact is that if the degree of colour is a matter of less importance as is the case when coloured fats or oils are treated, the double or threefold quantity of contact substance could safely be added as compared with the quantity hitherto employed without involving an increase of costs beyond those of the known processes because the regeneration costs are very low, which allows of reducing the reaction period to one half. It is thus possible to complete a decomposition operation in the course of 12 to 15 hours with a use of contact substance less than 0.5 per cent. As mentioned above a fatty acid in which the contact substance is dissolved becomes coloured when subjected to oxidation by the oxygen of the air at a raised temperature.

In the execution of the Twitchell decomposition process it has hitherto been usual to employ a pan with a steam inlet at the bottom and a cover provided with steam outlet. The charge in the pan has then been so proportioned as to obtain a certain "rising space" below the cover for the steam condensed during the operation. It has been assumed that the air would become completely displaced by the steam flowing through the fat mixture and the socalled "rising space" at the top of the pan. The same pressure prevailing within the pan as outside of the same there is however nothing to prevent a current of air from entering in an opposite direction to that of the steam. In any case the possibility of the air exerting its action is not eliminated.

An important feature of the present invention now consists therein that the decomposition is carried out under such conditions as to prevent the air from acting upon the charge. To obtain this the "rising space" referred to is suitably dispensed with and instead of introducing steam directly into the charge the charge is heated by indirect application of heat. Moreover the stirring action necessary to effect the emulsifying is produced by means of an agitator mechanism.

By these means and by heating the charge to about 100° C. by indirect steam heating very satisfactory results have been obtained.

An apparatus for use in carrying the decomposition into effect is illustrated by way of example in the accompanying drawing, in which—

Fig. 1 is a vertical sectional view of the apparatus,

Fig. 2 is a plan view of the same.

In the illustrated example the decomposition vessel consists of a strong wooden tank 1 provided with an agitator mechanism. This latter consists of a stationary cylinder 2 being provided with ribs 3 on its interior surface. The ribs 3 are arranged along screw lines. Within the cylinder is arranged a rotatable part comprising a shaft 4 to which are fastened two vertical flat rods 5 diametrically opposite to one another.

When the shaft 4 rotates, that part of the liquid, which is within the cylinder 2 will also be caused to rotate and at the same time the outer layers of this liquid will move upwards between the screw ribs, an upward current being thus produced. The tube or cylinder 2 is placed on the bottom of the vessel and is provided with openings 6 at the lower edge, which enables liquid to flow into the cylinder along the bottom of the vessel. When the vessel is completely filled the heavy layer of water will be on the bottom while the layer of oil will be at the top. When the agitator rotates water is drawn into the cylinder 2 and is lifted up into the oil layer. Gradually a homogeneous mixture is obtained which constantly circulates through the cylinder or tube 2. Moreover the centrifugal power will cause the water to remain substantially in the peripherical part of the cylinder, which will bring about a constant circulation of water through the oil.

Gases (especially air) which may be suspended in the liquid will gather along the shaft, ascend and collect in the bell 7 below the bearing 8, from where it will escape through the tube 9.

When the vessel has been filled the mixture is heated preferably first by means of direct steam heating to near the boiling point, the temperature being controlled by means of the thermometer 10. The steam supply is then closed and the valve 16 to the steam coil 11 is opened. The operation may now be continued in such a manner that the level of the liquid when a temperature of 100 is reached is at the height of the outlet pipe 12 in the cylinder 13. The float 14 then lifts the lever 15, the load on the valve 16 (of the heating coil) being thus brought to action causing the steam supply to be shut off.

As soon as the temperature in the vessel is lowered the volume will decrease causing the float to sink, the steam valve 16 being then again opened. It will be understood that instead of the described arrangement other temperature controllers may be made use of. The emulsifier above described may be used also for other purposes than that hereinbefore described.

*Example.*

(a) *Decomposition agent—Manufacture.*— A fatty acid for instance oleic acid is mixed with an aromatic substance for instance naphthalene in equimolecular proportions. To the mixture is then added a solvent for instance benzol in such quantity as to produce a clear solution. To the solution is now added sulphuric acid under constant cooling and stirring, a temperature of below 5° C. being maintained. When a substance has been formed which with water produces a clear solution the addition of sulphuric acid is interrupted and the reaction mass is left at rest for 12 to 24 hours. The reaction mass is then brought to flow as a thin jet into water under constant stirring and cooling, a temperature of below 5° C. being still maintained. When left to stand a layer of acid will separate at the bottom and is then drawn off. This operation is repeated several times until the aromatic sulphonic acids are removed. After the last washing with dilute sulphuric acid and after 12 to 24 hours standing the acid layer is drawn off very cautiously, whereby the remainder is obtained substantially free from acid.

Water is now added to the remaining liquid under stirring. An standing two layers will again be formed the lower one consisting of an aqueous solution of the active decomposition agent in a pure condition while the upper layer will consist of unchanged oleic acid and naphthalene as well as the solvent benzol. This latter mixture of substances is then again subjected to sulphonation, whereby further quantities of decomposition agent is obtained.

From the aqueous solution the decomposition agent when desired can be obtained in a concentrated (nonaqueous) condition by means of evaporation under a reduced pressure (vacuum).

(b) *Decomposition agent—Use.*—The fat to be decomposed by means of the above described substance is first treated in the usual manner with sulphuric acid of ½ per cent. The separated acid water is drawn off and the fat is washed several times with water to remove acid suspended in the same. After washing the fat is introduced in the decomposition vessel where it is supplied with from 0.5 to 2 per cent of the decomposition agent. By means of directly introduced steam, the mixture to which also some water has been added is heated to about 100° C. The supply of steam is now interrupted and the agitator is started, care being taken that the air is wholly removed from the vessel. The temperature is maintained at about 100° C. After 6 to 20 hours stirring the degree of decomposition is about 80 per cent (free fatty acids) and the agitator is stopped. After a couple of hours standing the glycerine water is completely separated at the bottom and is drawn off. When a fresh quantity of water has been added the stirring is now continued during 2 to 6 hours.

The degree of decomposition will now be about 95–98 per cent at which stage the decomposition operation is interrupted and the aqueous liquid (second water) is drawn off.

(c) *Decomposition agent—Recovery.*—The glycerine water, which has been drawn off contains from 50 to 80 per cent of the added decomposition agent. This decomposition agent is precipitated from the solution by the addition of carbonate of calcium (or carbonate of barium) the corresponding calcium (or barium) salt being thus obtained as a precipitate. The calcium (or barium) salt is separated from the aqueous liquid and is decomposed by means of sulphuric acid, active decomposition agent and the sulphate of calcium (or barium) being obtained.

The "second water" will also contain some decomposition agent and is suitably employed to initiate the next decomposition operation.

I claim:

Process of producing sulphoaromatic substances for use in the decomposition of fats which consists in subjecting a mixture of fatty acid and aromatic substance to sulphonation at a temperature below the melting point of the said mixture, the sulphonation taking place in the presence of a quantity of a solvent for the said mixture sufficient to produce a solution which is fluid at the said low sulphonation temperature.

In testimony that I claim the foregoing as my invention, I have signed my name in presence of two subscribing witnesses.

ARNE GODAL.

Witnesses:
Moguss Brigge,
Mathilde Engehelsen.